United States Patent [19]

Beyer et al.

[11] 4,296,414

[45] Oct. 20, 1981

[54] P-I-N TYPE DIODE HIGH FREQUENCY SWITCH FOR SECONDARY RADAR INTERROGATION DEVICES AND TRANSPONDERS

[75] Inventors: Franz Beyer, Munich; Siegfried Sedlmair, Groebenzell, both of Fed. Rep. of Germany

[73] Assignee: Siemens Aktiengesellschaft, Berlin & Munich, Fed. Rep. of Germany

[21] Appl. No.: 98,638

[22] Filed: Nov. 29, 1979

[30] Foreign Application Priority Data

Dec. 20, 1978 [DE] Fed. Rep. of Germany ....... 2855173

[51] Int. Cl.³ .......................... G01S 13/02; H01P 1/15
[52] U.S. Cl. ................................. 343/5 SW; 333/103
[58] Field of Search ............ 343/5 SW, 5 W; 333/103

[56] References Cited

U.S. PATENT DOCUMENTS

| | | | |
|---|---|---|---|
| 3,032,723 | 5/1962 | Ring | 333/103 |
| 3,095,538 | 6/1963 | Silberstein | 343/5 SW X |
| 3,374,364 | 3/1968 | Concelman | 333/103 X |
| 3,474,358 | 10/1969 | Geddry et al. | 333/103 |
| 3,678,414 | 7/1972 | Hallford | 333/103 |
| 3,720,888 | 3/1973 | Manuali | 333/103 |
| 3,745,580 | 7/1973 | Burnham | 333/103 X |
| 3,909,751 | 9/1975 | Tang et al. | 333/103 |
| 3,916,349 | 10/1975 | Ranghelli et al. | 333/103 X |
| 4,016,516 | 4/1977 | Santer et al. | 333/103 X |

Primary Examiner—Malcolm F. Hubler
Attorney, Agent, or Firm—Hill, Van Santen, Steadman, Chiara & Simpson

[57] ABSTRACT

A P-I-N type diode high frequency switch in a secondary radar interrogation device working with ISLS and RSLS and consisting of a transmitter, two receivers and two antennas. So as to reduce the high cost for P-I-N type diodes, including driver stages for the transmission and reception separation and to eliminate the necessity of an antenna switching unit, the terminals 19 and 20 of a pair of antennas are directly connected through single lines 23 and 24 to band pass filters 5 and 6 connected to respective receivers 7 and 8 with the band pass filters 5 and 6 blocking the transmission signal and allowing reception of received signals and wherein the electrical lengths of the line and the band pass filter is such that the input impedance corresponding to no-load operation occurs at the corresponding antenna terminal for the transmission frequency. The invention can be used in secondary radar transponders operating with two antenna diversity and the high frequency switch of the invention can be used in both civil secondary radar interrogation devices as well as military IFF interrogation devices as, for example, in ground stations.

8 Claims, 4 Drawing Figures

P-I-N TYPE DIODE HIGH FREQUENCY SWITCH FOR SECONDARY RADAR INTERROGATION DEVICES AND TRANSPONDERS

BACKGROUND OF THE INVENTION

1. Field of the Invention

This invention relates in general to a novel P-I-N diode switch for use in secondary radar interrogation devices which are equipped with means for side lobe suppression in the interrogation and reply path (ISLS and RSLS). The P-I-N diode high frequency switch provides for the distribution of interrogation pulses arriving from a transmitter to a first antenna and the reference level pulses passing from the same transmitter to a second antenna by means of two P-I-N type diodes controlled by a driver circuit to render them either blocking or short circuited. One terminal of the P-I-N type diode is respectively connected by way of a T element consisting of three quarter-wave length line pieces on the one hand to the transmitter terminal and on the other hand to the terminal for one of the antennas. The other diode is similarly connected to the terminal of the other antenna, for relaying reception signals from the two antennas to two receivers with each receiver having a corresponding antenna and each receiver having a band pass filter at its input which blocks the transmission signals but allows the reception signals to pass through.

2. Description of the Prior Art

It is known in the primary radar technology to employ an antenna change-over switch for de-coupling transmitter and receiver when one employs a common antenna for transmitting the transmission pulses and for the reception of an echo signal. However, the transmission and reception frequencies are essentially identical so that they can be separated only by means of a switch. Therefore, the fact that the transmission pulse and the reception period are in time succession is utilized. Such an antenna change-over switch can be employed in a secondary radar interrogation device with ISLS and RSLS instead of an antenna switching unit. One can then connect this antenna change-over switch or TR switch to the P-I-N type diode switch for connecting one of the two antennas to the transmitter.

SUMMARY OF THE INVENTION

Side lobe signal suppression in the interrogation path can be accomplished due to the fact that in addition to the actual interrogation transmitted with a directional antenna an additional signal supplies a reference level to a transponder through an antenna having a different antenna diagram. With the use of level comparison, it can be determined in the transponder whether the signal comes from a main or from a side lobe. Interrogations from the side lobes are not answered by the transponder. In side lobe signal suppression on the reply path all replies are received by the interrogation system by way of two separate channels, on one hand by way of the directional antenna with a following receiver and on the other hand by way of the omni-directional antenna which supplies a following receiver. The two receiver outputs are logically linked to each other by means of an amplitude comparison means such that only signals captured by the main lobe are displayed. In the secondary radar interrogation device of the invention, both side lobe signals suppression methods are simultaneously employed.

On the high frequency side of a secondary radar interrogation device using side lobe signal suppression, a number of jobs are thus accomplished. On the other hand, the proper connection of the transmitter to one of the two antennas must be accomplished. The transmission signal must also be time divided. The actual interrogation pulses arrive at the directional antenna whereas the reference level pulse is beamed out through an omni-directional antenna. Finally, the receivers must be isolated and separated from the transmission signal during the transmission mode.

It is known to achieve the object using P-I-N type diode switches and on the other hand by means of a transmission/reception shunt. Since the transmission and the reception frequencies are different in secondary radar operation, a notch diplexer may be employed for de-coupling the transmission and reception paths. The actural high frequency switch utilizes P-I-N type diodes as the switching elements. Specifically, these are semiconductor diodes which have essentially lost their rectifier property at the carrier frequency of 1030 Megahertz which equals the interrogation frequency and the transmission frequency and at 1090 Megahertz which is the reply frequency and the reception frequency. In these frequency ranges, the diodes function only as switched resistors and then either have a high or a low resistance value depending on the switching state. For connecting one of the two antennas to the transmitter, a P-I-N type diode switch such as disclosed in the book by Honold, "Sekundar-Radar", 1971, Siemens AG, at pages 101 through 104 which discloses two P-I-N type diodes can be used in two switch branches.

Thus, an antenna switching unit is provided for separating the transmitters and the receivers. By the use of the switching unit, the receivers can be connected to the associated receiving antennas.

The P-I-N type diode switch arrangement illustrated in FIG. 1 substantially coincides with that illustrated on page 102 of the book by Honold in FIG. 2.9. The drive of the two P-I-N diodes 1 and 3 or alternatively 2 and 4 allows receivers 7 and 8 to be respectively connected by way of band pass filters 5 and 6 to first terminals of the P-I-N diodes 1 and 2, respectively. The impedance of the diodes is adjusted with a control circuit 9 which has driver stages so that the diodes can operate either in no-load or short circuit fashion. The quarter-wave length line members 10 through 18 also provide an impedance transformation. It is characteristic of a resistance transformation that a short circuit at the input of a quarter-wave length line appears at the output as an open circuit impedance.

On the other hand, an open circuit impedance at the input of a quarter-wave length line is transformed into a short circuit at the output. By the means of such transformations, the impedance value of the P-I-N type diodes 1 through 4 in FIG. 1 can be displaced without it being necessary that the corresponding components are physically present at the respective locations.

The P-I-N type diodes 3 and 4 in FIG. 1 assure that the connection of the antennas connected to the terminals 19 and 20 are connected to the transmitter terminal 21. During this time, the suitably switched P-I-N type diodes 1 and 2 are short circuited so that the two receivers 7 and 8 are disconnected during the transmission mode. When the receivers 7 and 8 are connected to the antenna terminals 19 or 20, respectively, all of P-I-N type diodes are 1 through 4 are placed in a no-load operation. The control signals generated in the control circuit are generated by means of special switch drivers which requires a relatively high circuit outlay for a total of P-I-N type diodes. It is also disadvantageous that the four P-I-N type diodes with their control circuit and, if necessary, the antenna switching unit require relatively high space allocation in the interrogation devices.

The object of the invention is to create a P-I-N type diode high frequency switch for secondary radar interrogation devices with side lobe signal suppression in the interrogation and reply path which does not require a great technical circuit outlay and expense and without the use of substantial space. According to the invention, the object is achieved in that each of the two antenna terminals is connected to a respective band pass filter through only one line and that the sum of the electrical length of the input impedance of a band pass filter and the electrical length of the line which lies between the band pass filter and the terminal of the antenna associated with this band pass filer is dimensioned in a manner such that a no-load operation occurs at the antenna terminal at the transmission frequency. In this arrangement, no antenna switching unit is required and two P-I-N type diodes together with their corresponding controls can be omitted from the prior art devices which P-I-N type diodes are required among other things for the transmission-reception change-over. It is also advantageous in the invention that a given transmitter internal resistance does not produce a disruptive effect during reception.

It is significant in the solution of the invention that the two band pass filters for transmission assures sufficient blocking. Also, for reasons of fabrication, the electrical length of the input impedance of the band pass filter must be identical in each of the band pass filter units.

The execution of the P-I-N type high frequency diode switch according to the invention can be accomplished in microstrip technology. The blocking capacitors of the two P-I-N type diodes are, respectively, designed in the form of a disk. The high transmission output occurring in the transmission mode can then no longer generate electrical discharges at the location of the capacitors since the discharge threshold can be substantially increased.

The invention also relates to P-I-N type diodes used as a high frequency switch in a secondary radar transponder which utilizes space antenna diversity devices having two antennas. The P-I-N type diode high frequency switch provides for connecting one of the antennas having reply pulses by means of two P-I-N type diodes controlled by a control circuit to be either in the blocking state or in a conducting short circuit state with one terminal of the P-I-N type diodes connected through a T element consisting of three quarter-wave length lines to the transmitter terminal into the terminal of one of the antennas or, respectively, to the terminal of the other antenna. In addition, the diode switches provide for relay of the received signals received at the two antenna terminals to the two receivers with each receiver associated with one of the antennas and wherein the band pass filters are connected in series with the receivers to block the transmitted signals but which allow the reception of received signals.

Disadvantages of the prior art P-I-N type diode high frequency switches in secondary radar transponders are the same as those of the diode switches used in interrogation devices.

Thus, the present invention makes it possible to provide P-I-N type diode high frequency switches for secondary radar transponders using two antenna diversity and wherein the switches make it possible to substantially simplify the circuit outlay and requires a relatively small space requirements.

In the present invention, this is achieved for transponders or interrogation devices by providing that each of the two antenna terminals is directly connected to the associated band pass filter by a single line and wherein the sum of the electrical length of the input impedance of the pass band filter and the electrical length of the line which lies between the band pass filter and the terminal of the antenna is selected such that a no-load condition occurs at the corresponding antenna terminal at the transmission frequency as far as the receiver is concerned.

Other objects, features and advantages of the invention will be readily apparent from the following description of certain preferred embodiments thereof taken in conjunction with the accompanying drawings, although variations and modifications may be effected without departing from the spirit and scope of the novel concepts of the disclosure and in which:

DESCRIPTION OF THE PREFERRED EMBODIMENTS

Figure 1:
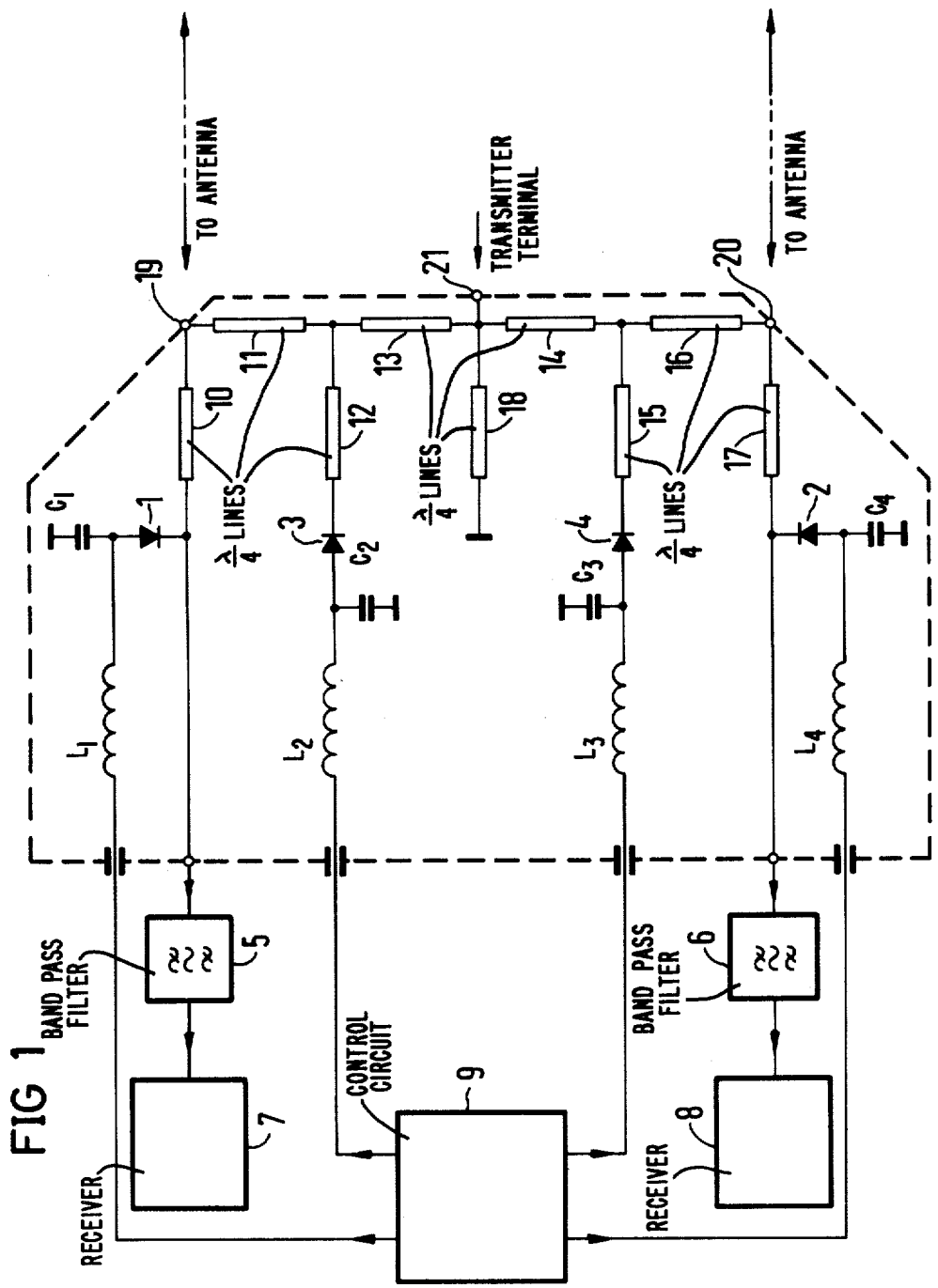
FIG. 1 illustrates an electrical schematic of a switching circuit.

FIG. 1 illustrates a receiver 7 which is connected through a band pass filter 5 and a quarter-wave length line to an antenna terminal 19 to which a suitable antenna is connected for transmitting and receiving information. A second receiver 8 is connected through a band pass filter 6 and a quarter-wave length line 17 to a second antenna terminal 20 to which a suitable antenna for transmitting and receiving information is connected. Quarter-wave length lines 11, 13, 14 and 16 are connected in series between terminals 19 and 20 and the junction point between the lines 13 and 14 is connected to a transmitter input terminal 21 as shown. A quarter-wave length line 18 is connected between terminal 21 and ground.

A control circuit 9 provides a first output through an inductor $L_1$ to the junction point between a P-I-N diode 1 which has its other side connected to the input of the band pass filter 5. The other side of the diode 1 is connected to ground through a capacitor $C_1$ as shown. A second output of the control circuit 9 is connected to a second inductor $L_2$ which has its other side connected to a P-I-N diode 3 which has its other terminal connected to a quarter-wave line 12 which has its other side connected to the junction point between lines 11 and 13. A second capacitor $C_2$ is connected between the diode and inductor to ground.

A third output of the control circuit 9 is connected through a third inductor $L_3$ to a P-I-N diode 4 which has its other side connected to a quarter-wave length line 15 which has its other side connected to the junction point between the lines 14 and 16. A capacitor $C_3$ is connected between the junction point between the diode 4 and the inductor $L_3$ to ground.

A fourth output of the control circuit is connected through a fourth inductor $L_4$ to a diode 2 which has its other side connected to the junction point between the band pass filter 6 and a quarter-wave length line 17 which has its other side connected to the antenna terminal 20. A capacitor $C_4$ is connected between the junction point between the diode 2 and the inductor $L_4$ and ground as shown.

Figure 2:
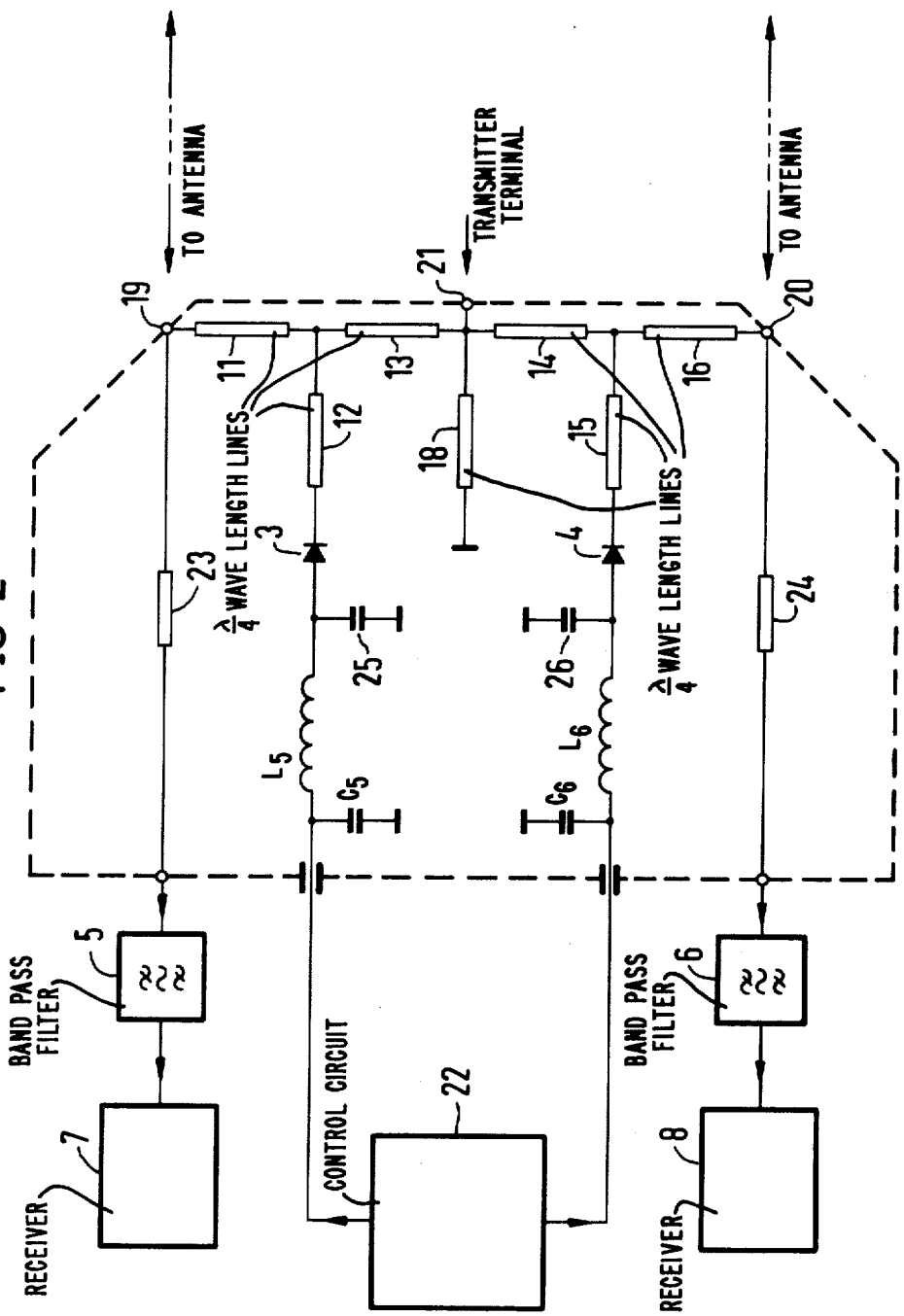
FIG. 2 illustrates an electrical schematic according to the invention.

FIG. 2 illustrates a circuit of the invnetion wherein similar elements illustrated in FIG. 1 refer to similar elements in FIG. 2. The circuit of FIG. 2 has been substantially simplified and, for example, the diodes 1 and 2 illustrated in FIG. 1 have been eliminated. The first antenna terminal 19 is connected to a quarter-wave length line 23 which has its other side connected to the input of the band pass filter 5. The second antenna terminal 20 is connected to a quarter-wave length line 24 which has its other side connected to the input of the band pass filter 6. A capacitor $C_5$ has been connected between the output of the control circuit 22 and ground before the inductor $L_5$ which is connected to the diode 3. Another capacitor $C_6$ is connected between the output of the control circuit 22 and ground before the inductor $L_6$ which is connected to the diode 4 as shown.

The connection of the transmitter at terminal 21 with the use of two P-I-N type diodes 3 and 4 is accomplished with the circuit of FIG. 2. If, for example, it is desired to transmit radiation from the transmitter at terminal 21 to the antenna connected to terminal 19 which might be the directional antenna for supplying the interrogation pulses, then P-I-N diode 3 must be short circuited and P-I-N type diode 4 must be in the open circuit condition. Thus, in this condition transmitted information from the transmitter will pass from terminal 21 to the transmitting antenna connected to terminal 19. In the condition where the transmitted information is to pass from terminal 21 to the antenna connected to terminal 20, the P-I-N type diode 4 must be short circuited and the P-I-N diode 3 must be in the no-load condition. The diode impedances are controlled to be approximately no-load operation or short circuit and are transformed at the transmission terminal 21 by the two quarter-wave length lines 12 and 13 in the first condition and in the second condition by the quarter-wave length lines 15 and 14. Transmission does not occur from the transmitter terminal 21 to antenna terminal 19 or, alternatively, to the antenna terminal 20 because the two quarter-wave length lines 11 and 13 or, alternatively, 14 and 16 are respectively connected in series to each other and, thus, by selectively rendering the diodes 3 and 4 conductive or open circuit with the control circuit 22 connection can be made between terminal 21 to the antenna terminal 19 or, alternatively, to the antenna terminal 20.

During reception, both of the P-I-N type diodes 3 and 4 are switched to the no-load or open circuit condition and the received signals pass from the antenna terminal 19 through the line 23 and band pass filter 5 to the receiver 7 and alternatively from antenna terminal 20 through line 24 band pass filter 6 to the receiver 8. The no-load operation of the P-I-N type diode 3 produces no-load operation at the interconnection point of lines 23 and 11. The no-load operation of P-I-N diode 4 produces no-load operation at the interconnection point of lines 24 and 16. During the reception condition, it is assured that the received signals pass between the antenna terminals 19 and 20 to the receivers 7 and 8 are mutually uncoupled since the no-load operation of the P-I-N diodes 3 and 4 will appear due to lines 12 and 15 as a short circuit in the lines 11, 13, 14 and 16 connecting the antenna terminals 19 and 20 to the receivers.

During the transmission condition, the sum of the electrical length of the input impedance of each band pass filter 5 and the electrical length of the line 23 to the antenna terminal point 19 produce a no-load operation for the transmission frequency. Also, during transmission, the electrical length of the input impedance of the band pass filter 6 and the electrical length of line 24 up to antenna terminal point 20 produces a no-load operation for the transmission frequency. The band pass characteristic of filters 5 and 6 must be selected such that a sufficient blocking of the transmitted frequency occurs. Also, the electrical lengths of the input impedance of each of the band pass filters 5 and 6 must be identical particularly for reasons of fabrication. The present invention does not require separate P-I-N type diode switches for the separation of the receivers 7 and 8 from the transmission pulses since due to the electrical length of the input impedance of the band pass filters 5 and 6 as well as the length of the lines 23 and 24, a no-load operation to the transmission frequency at the respective antenna terminals 19 and 20 is accomplished. Due to the reflections of the two band pass filters 5 and 6, the transmission output cannot arrive at the receivers 7 or 8. The reflection also assures that a no-load operation exists at the antenna terminal points 19 and 20 during operation in the transmitting mode.

The blocking capacitor 25 comprises a shunt element from the output of the control 22 to the P-I-N diode 3. The capacitor 26 provides a shunt element between the output of the control circuit 22 and diode 4. The P-I-N type diode switch can be constructed in micro-strip technology which is particularly advantageous and the two capacitors 25 and 26 can be each designed and formed as spots or disks in an expedient manner. This substantially increases the discharge threshold of the capacitors which is particularly advantageous because of the high transmission power levels which occur.

If a mono-pole antenna is used instead of a directional antenna and an omni-directional antenna, the sum signal will exist at the antenna terminal 19 and the different signal will occur at the antenna terminal 20. The interrogation pulses of the transmitter are then transmitted by the antenna as the sum of the inputs and the reference level pulses are transmitted as the difference signal received at terminal 20. The received signals are also supplied through the corresponding antenna terminals 19 and 20 for the sum and difference to the receivers 7 and 8 in which a level comparison can occur between the signals picked up by the two receivers 7 and 8 for purposes of signal evaluation.

Figure 3:
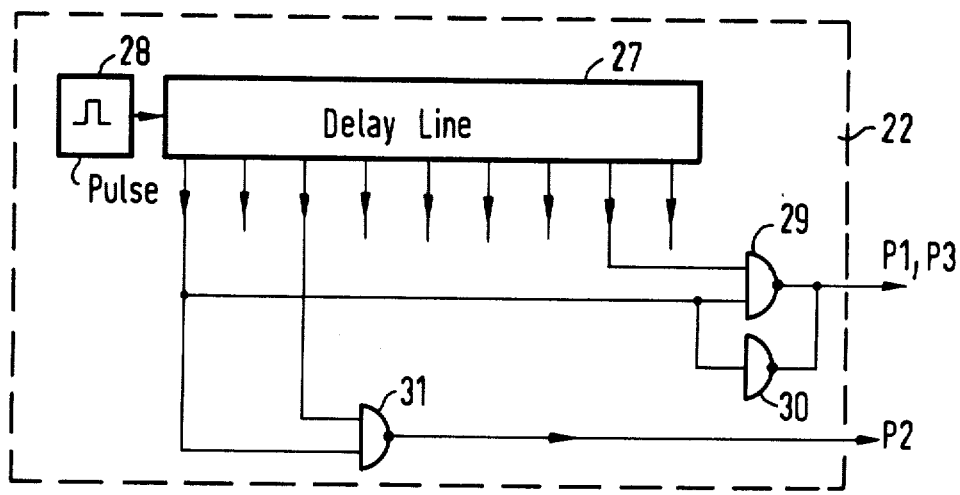
FIG. 3 is an electrical schematic of the control circuit.

FIG. 3 illustrates the control circuit 22 shown in FIG. 2. A pulse generator 28 produces pulses which are supplied to the input of a delay line 27. Normally, the pulse generator 28 forms a part of a primary radar apparatus. The primary radar device is normally combined with the secondary radar device and also generates the primary radar pulses. The delay line 27 serves for pulse coding and has a plurality of output taps. The interrogation pulses P1, P3 are generated by the gates 29 and 30 which are connected to the outputs of the delay line 27. A gate 31 is also connected to the outputs of the delayed line 27 and produces a reference level pulse P2. The pulses P1, P2 and P3 are supplied by way of the output lines of the control circuit 22 to the P-I-N type diodes 3 and 4 through the driver stages illustrated.

Figure 4:
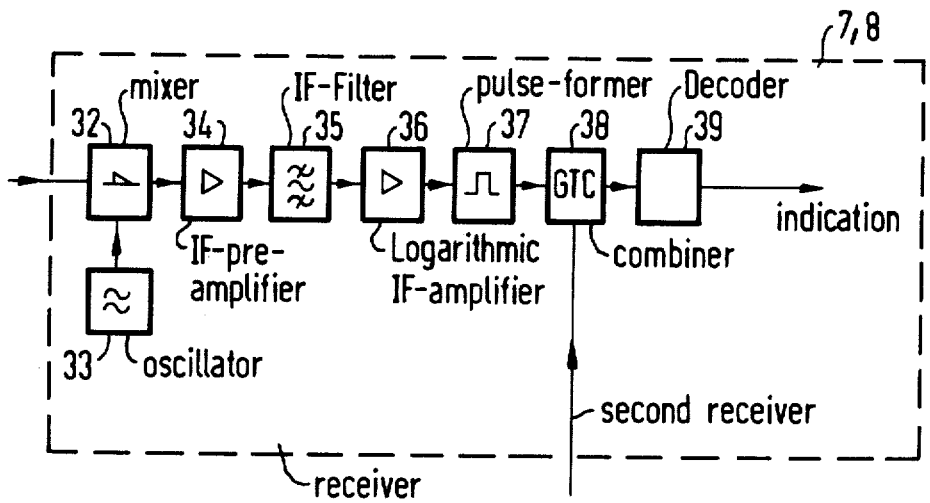
FIG. 4 is an electrical schematic of a receiver.

FIG. 4 is a block diagram of the receivers 7 and 8. Each of the receivers includes a mixer 32 which receives an input signal as well as an input from an oscillator 33. An intermediate frequency pre-amplifier 34 receives the output of the mixer and supplies an input to an IF filter 35. A logarithmic intermediate frequency amplifier 36 receives the output of filter 35 and supplies an output to a pulse forming circuit 37 for the video signal. A gain time control circuit 38 GTC has a combination element for connecting the corresponding video signal from the other receiver and supplies an output to a decoder 39 which is connected to a suitable display device. Such receiver as illustrated in FIG. 4 is described, for example, in the previously referenced book by P. Honold, "Sekundar-Radar", Siemens AG, Munich and Berlin, 1971 at pages 104 through 119.

Although the invention has been described with respect to preferred embodiments, it is not to be so limited as changes and modifications can be made which are within the full intended scope of the invention as defined by the appended claims.

We claim:

1. A P-I-N type diode high frequency switch provided in a secondary radar transponder which has an antenna diversity device equipped with two antennas, said P-I-N type diode high frequency switch being provided for supplying one of the two antennas with required pulses by means of two P-I-N type diodes operated by a control circuit either in the blocking state or in the short circuit state, one terminal of said P-I-N type diodes being respectively connected, via a T-element consisting of three quarter-wave length line pieces, to the transmitter terminal and to the terminal for one antenna or, respectively, to the terminal for the other antenna, as well as for relaying the reception signals existing at the two antenna terminals to two receivers of which each is associated with one antenna and which has connected at its input a band pass filter for blocking the transmission signal but allowing the reception signals to pass therethrough, characterized in that each of said two antenna terminals (19, 20) is directly connected to the associated band pass filter (5, 6) only through one line (23, 24); and the sum of the electrical length of the input impedance of one of the band pass filters (5, 6) and the electrical length of one of the lines (23, 24) which are between the band pass filter and the terminal of the antenna associated with this band pass filter is dimensioned such that a no-load condition occurs at the antenna terminal at the transmission frequency.

2. A P-I-N type diode high frequency switch according to claim 1 characterized in that it is constructed with lines 23 and 24.

3. A P-I-N type diode high frequency switch according to claim 1 characterized that it is constructed in micro-strip technology.

4. A P-I-N type diode high frequency switch according to claim 3, characterized in that blocking capacitors for each of the P-I-N type diodes are provided and they are designed in the form of a disk.

5. A P-I-N diode switching circuit for a secondary radar interrogation device comprising, first and second antenna terminals (19, 20) to which first and second antennas are, respectively, connected, a transmitter terminal (21) to which a transmitter is connected, first and second quarter wave length lines (11, 13) connected in series between said first antenna terminal (19) and said transmitter terminal (21), third and fourth quarter wave length lines (14, 16) connected between said transmitter terminal (21) and said second antenna terminal (20), first and second bandpass filters (5, 6), a fifth quarter wave length line (23) connected between said first antenna terminal (19) and said first bandpass filter (5), a first receiver (7) receiving the output of said first bandpass filter (5), a sixth quarter wave length line (24) connected between said second antenna terminal (20) and said second bandpass filter (6), a second receiver (8) receiving the output of said second bandpass filter (6), a seventh quarter wave length line (18) connected between said transmitter terminal (21) and ground, first and second P-I-N diodes (3, 4), an eighth quarter wave length line (12) connected between the first diode (3) and the junction point between the first and second quarter wave length lines (11, 13), a ninth quarter wave length line (15) connected between said second diode (4) and the junction point between said third and fourth quarter wave length lines (14, 16), and a control circuit (22) with first and second outputs, respectively, connected to said first and second diodes (3, 4) to make them open or short circuited and the sum of the electrical lengths of the first bandpass filter (5) and the fifth quarter wave line (23) and the sum of the electrical lengths of the second band path filter (6) and the sixth quarter wave length line (24) is such that a no-load condition occurs at the first and second antenna terminals (19, 20) at the transmission frequency.

6. A P-I-N diode switching circuit according to claim 5 including a first inductor ($L_5$) connected between said first diode (3) and said first output of said control circuit (22) and a second inductor ($L_6$) connected between said second diode (4) and said second output of said control circuit (22).

7. A P-I-N diode switching circuit according to claim 6 including a first capacitor (25) connected between said first diode (3) and ground and a second capacitor (26) connected between said second diode (4) and ground.

8. A P-I-N diode switching circuit according to claim 7 including a third capacitor ($C_5$) connected between ground and the first output of said control circuit (22) and a fourth capacitor ($C_6$) connected between ground and said second output of said control circuit (22).

* * * * *